Patented May 16, 1939

2,158,469

UNITED STATES PATENT OFFICE 2,158,469

CORK COMPOSITION

Charles E. McManus, Spring Lake, N. J., assignor to Crown Cork & Seal Company, Inc., Baltimore, Md., a corporation of New York No Drawing. Application September 14, 1934, Serial No. 744,098. Renewed September 30, 1938

3 Claims. (Cl. 106—23)

The present invention relates to cork composition and method of making same. By cork composition, is meant a composite cork structure formed predominantly of cork granules in closely compacted relation and which are held together by a binder. Such cork composition is prepared in the form of blocks, cylinders, sheets and in various shapes of either final commercial state or in form suitable for fabricating operations.

It is an important feature of the present invention, that the cork composition may be manufactured into the particular form or product by molding, extruding, packing, rolling or sheeting. This is made possible by coating the granules with a binder which, in its unset or unhardened condition, does not interfere with the free flowing of the binder coated cork. Thus, the binder coated cork in contradistinction to a sticky agglomerate may be fed or piped in predetermined amounts, intermittently or continuously, from a suitable storage receptacle or from a hopper to the forming instrumentality.

The cork composition of the present invention possesses a light color comparable to natural cork and is characterized by possessing a maximum of cork properties. That is to say, the cork does not lose its identity and the product possesses enhanced compressibility and rebound. The cork composition of this invention is, therefore, resilient. It is also flexible and elastic and free of brittleness.

Cork composition is used in a variety of applications and is subjected to varying temperature conditions, moisture and not infrequently to chemical action. The present cork composition meets these requirements and is also acid and alkali resistant, resistant to mold growth, free of odor or odor contaminations, does not shrink or curl, and possesses a long life.

In the manufacture of cork composition the margin of profit is small and any reduction in production costs is of substantial advantage. The present cork composition may be formed in an economic time cycle; that is, the several operations including the making up of the binder, mixing with the cork, forming to shape, and setting the binder to produce the final article are capable of accomplishment in a relatively short time period and with automatic apparatus.

In addition to the various characteristics alluded to, the cork composition of this invention in some of its embodiments is free of glycol and hence does not impart objectionable taste to food products when used as a cushion liner for sealing caps, nor does the cork composition react with the lacquers or other coatings associated with the metal cap. Again, the binder is compatible with various adhesives which are used in the case of so-called spot caps for adhering the foil or paper spot the cork composition.

One important member of the present cork composition is latex or rubber which I find enhances the qualities and properties desired in a cork composition as related above, and moreover, renders the cork composition universally applicable or adaptable without substantially increasing cost of production.

In describing the cork composition and its method of manufacture, reference will be made to a number of embodiments which, for convenience, will be denominated (1) latex proteid, (2) latex resin, (3) latex tung oil and (4) latex wax. I have found that the various cork compositions to be later described under this grouping, possess a particular utility as sealing liner material for caps in the beverage drug and general chemical field, and, are universally adaptable for the various other purposes to which cork composition is applied such as gaskets, clutch facings and window channel material.

By "latex proteid" is meant a binder comprising essentially latex and a proteid.

By "latex resin" is meant a binder comprising essentialy latex and a synthetic or natural resin.

By "latex tung oil" is meant a binder comprising essentially latex and tung oil.

By "latex wax" is meant a binder comprising latex and wax as described in the patent to Weiss 1,563,410 Dec. 1, 1925, or latex and a petrolatum type of non-aqueous material as defined in "Chemical Dictionary" by Hachk, 1929.

The term "latex" is intended in this specification to include the pure latex juice as well as commercially available adhesive solutions and dispersions of latex, rubber, gutta percha and balata, which may include as required, preserving, coagulating, vulcanizing and/or accelerating agents. Again, the term "latex" is inclusive broadly of latex and a carrier, latex petrolatum mixtures, and latex paraffin or wax compositions, particularly as described in the said patent to Weiss.

The term "proteid" is inclusive of vegetable, animal and mineral glues and gelatins such as bone and hide glue and gelatin, as well as albumen and casein, all as defined in "Chemical Dictionary" by Hachk, 1929.

The term "resin" includes synthetic resins, e. g., condensation products of phenol and formaldehyde, urea and formaldehyde, mixtures of urea formaldehyde and phenol formaldehyde resins, also cumaron resins, vinyl resins, and alkyd resins, as well as natural resins exemplified by the copals and dammars. Mixtures of synthetic and natural resins sometimes are used.

The term "tung oil" will include the raw tung oil of commerce, polymerized tung oil, but preferably tung oil which I denote as "bodied tung oil" and which I find particularly advantageous. This is produced by taking tung oil or Chinawood oil and subjecting the same to a temperature of substantially 450° to 500° F. in an open kettle for about one hour. Thereafter, the bodied product is preferably cooled to about 450° F.

This treatment imparts to the tung oil a body or concentration which I find particularly useful in the manufacture of the binder. The tung oil, as stated, is heated until it reaches a bodied state and particular care is exercised not to carry the treatment further. In other words, the heating is checked when the oil becomes bodied and has the viscosity characteristic of a varnish maker's string.

Hardening, tanning or insolubilizing agents for the proteid are employed including hexamethylenetetramine, formaldehyde and paraformaldehyde. In the matter of the resin, curing agents, hardeners or accelerators such as oxalic and other organic acids are employed, as well as sulfuric acid and hexamethylenetetramine. In some cases as where a proteid resin binder is used, sufficient free formaldehyde or other agent is present to cure the proteid without the inclusion of a specific tanning agent. Again in the case of a resin tung oil cork composition, the reaction is such for example, where formaldehyde is present, as to permit the use of hexamethylenetetramine alone as the curing agent for the resin and a specific accelerator or hardener for the resin is frequently unnecessary.

I prefer to use, although in some cases it is omitted, a solvent for the tung oil, proteid and resin, which also acts to disperse and preserve the latex. A solvent which is best suited is one also exhibiting hygroscopic properties assuring long life to the cork composition and particularly having a plasticizing action. Thus glycerine, glycol (di or tri-ethylene glycol) and sulphonated castor oil are desirable solvent plasticizers. For sealing liner cork compositions in the beverage, drugs and chemical field, glycerine is used since glycol and sulphonated castor oil, while useful for cork compositions in practically all other applications exhibit odor and taste imparting objections; glycol moreover attacks and dissolves the cap lacquers. Water is also useful for softening and dissolving the proteid.

With each of the several binder compositions particularly where the cork composition is to be made by an extruding process, i. ie., extruded into rods or sheets, I include a suitable wax. This wax will have the required melting and hardening point for the intended cork composition and is of vegetable, animal or mineral origin. Paraffin, carnauba, beeswax, white and yellow wax, are examples of those employed. In the case of beverage cap liners, the wax will preferably be one imparting neither taste nor odor to the cork composition. Again, the melting point of the wax will be selected in accordance with the use of the cork composition, i. e., the degree of heating to which the cork composition will be subjected. The wax in fluid condition will readily mix in most cases with the several binders and performs the function of a lubricant for the cork composition. This property is particularly important where the cork composition is extruded, the lubricant very materially aiding in the extruding operation, and is also assistive in usual molding operations to overcome any possibility of sticking of the cork composition. Only a small percentage of wax is added to the binder, preferably an amount to exert in the particular cork composition a lubricating function. The wax, as will be appreciated, also has a binding action, stabilizes the cork composition and enhances its chemical resistance and waterproofing.

When the wax employed is not readily miscible with the binder, a suitable wax carrier may be employed as understood in the art, e. g., a latex or rubber mixture will be used as described in said patent to Weiss.

The wax has a further important property, where combined with latext, of maintaining the composition stable, i. e., preventing flowing of the latex.

The wax, as will be understood, may be omitted if desired although in many instances its inclusion is preferable.

LATEX GEL

*Glue-glycol-latex-gel*

By glue-glycol-latex-gel is meant a cork composition comprising comminuted cork and these several ingredients or equivalents thereof as recited above to which may be added, if desired, a suitable wax.

In the manufacture of a cork composition comprising, by way of example, a binder of latex, and a proteid, e. g., glue, there is used one of the above mentioned adhesives, such as bone or hide glue, and the same is placed in a closed jacketed kettle or other similar apparatus, to which is also added a solvent, such as a polybasic alcohol. Glycol, for example, diethylene or triethylene glycol or glycerine is a satisfactory alcohol. For example, (1) glue and glycol are stirred to thoroughly mix them, and with or without continuing the agitation, the kettle and the mixture therein are heated to substantially 180° F. for about three hours in order to effect complete softening and solution of the glue. The proportion of glue to glycol can be varied, but is preferably in the ratio of four parts of alcohol to one of glue. This ratio depends upon the strength and quality of the glue, since a strong glue may require as much as six parts of the solvent. As one example, four pounds of glycol and one pound of glue are mixed in the kettle and subjected to the heat treatment described. It is preferable not to go above 180° F., since I find that higher or sustained temperature tend to deteriorate or destroy the glue base so that it loses its adhesiveness. The mixture is cooled to substantially 160° F. and drawn off at this temperature for admixture with the granulated cork.

There is added to this mixture the latex as herein above described which is thoroughly mixed with the glue-glycol solution.

Before this binder solution is admixed with the cork, there is added to it a suitable hardening or insolubilizing agent for the proteid. As hardening or tanning agents, there are used formaldehyde, paraformaldehyde or hexamethylenetetramine. For example, there is employed a hardening solution consisting substantially of one part hexamethylenetetramine in one and one-half parts water.

This hardening agent is added to the binder at substantially 160° F. and the binder solution is now mixed for about thirty seconds with the comminuted cork in any suitable type of mixing machine. The cork granules are coated with this binder solution and immediately passed to a suitable mold or forming instrumentality. The time period is important in that it is necessary that the binder coated cork be supplied to the forming instrumentality before the hardening agent becomes effective to harden the glue.

As a modification of this procedure, the binder coated granulated cork, after mixing with the hardening agent, is passed to a chilling room. That is, the binder solution, including the hardening agent, is subjected to a thirty second mixing with the comminuted cork and thereafter immediately stored in bins or hoppers at a temperature of about 40° F. The chilling room has substantially no humidity as tested by the web bulb and is maintained cold by means of air washed and chilled at a low temperature. The storage of the binder coated comminuted cork at a low temperature will prevent any substantial hardening of the glue and it will be fed as required to the forming instrumentality.

In either case, the granules coated with a thin binder film will be free flowing, so that the apparatus will not be clogged. Moreover, the cork will be uniformly distributed, assuring a dense and uniformly compacted cork composition.

After the binder coated cork has been formed, the mold or other forming means is preferably passed for about two hours through a travelling oven heated to a temperature of substantially 290° F. to 300° F., whence the binder of latex and proteid is set and dried. It is desirable not to go above 320° F. in the oven in order to avoid any possibility of charring the cork. After passage through the oven, the cork composition is cooled and removed from the forming means. This forming means may be a block mold, a cylinder mold, a sheet mold, a packing tube, or a rolling mill and articles of any desired size and shape will be produced.

In the manufacture of a cork composition in accordance with the above process, there is used substantially four pounds of glycol and one pound each of glue and latex, which is mixed at 160° F. with about three ounces hexamethylenetetramine solution for each three pounds of the binder. Substantially three pounds of the binder at approximately 160° F., will be mixed with about twelve to thirteen pounds of cork for forming the cork composition. These various proportions are exemplary and are substantially followed in large or bulk production.

The binder coated cork with or without the hardening agent, as stated, will be free flowing as distinguished from a sticky agglomerate. The step of forming may immediately follow the mixing operation or the binder coated cork may be stored and used as required. Throughout the operation, temperatures will be controlled so as to prevent any objectionable action upon the glue latex, whereby it retains its maximum adhesiveness.

The use of a polybasic alcohol solvent has the further important function of providing a cork plasticizer, thereby enhancing the flexibility, elasticity and life of the cork composition.

The cork composition possesses a light color comparable to natural cork, a high tensile strength, and is characterized by flexibility and a high degree of compressibility and rebound. This resilience of the cork composition is enhanced by the binder and, as heretofore stated, the cork properties are present in the cork composition in which the cork predominates by volume.

Glycol will eliminate the use of water as a solvent for the glue and therefore obviate one of the causes of shrinkage, curling and brittleness, due to evaporation of water. The presence of the plasticizer, polybasic alcohol will likewise render the cork composition substantially free of brittleness. Again, the cork composition possesses hygroscopicity, which likewise insures continuous flexibility.

The latex materially adds to the flexibility, resiliency, and tensile strength of the cork composition and renders it waterproof.

These are all very important characteristics and qualities of a product such as cork composition, which is used under a variety of conditions. For example, the cork composition of this invention is useful in the automobile industry for gaskets, window channels and in the closure industry as a liner material for caps for sealing certain kinds of medicines, chemicals and food products. Thus the cork composition is resistant to the action of moisture, heat and cold, alkalies and to weak acids. The tensile strength, resilience, flexibility and elasticity are properties which permit the cork composition to be compressed without danger of cracking or tearing under pressure.

GLUE-GLYCERINE-LATEX $$Glue - \begin{Bmatrix} glycol \\ glycerine \end{Bmatrix} - latex - gel$$

By glue latex glycerine gel is meant a binder as just above described wherein a portion or all of the glycol solvent is replaced by glycerine; I also include a suitable wax for certain compositions.

Glycerine, I find, imparts a greater flexibility to the final cork composition and in addition to being a solvent for the glue is also a very satisfactory cork plasticizer, i. e., cork softener. The glycerine is hygroscopic, giving continuous or greater life to the binder, so that brittleness is avoided, and all possibility of shrinkage is overcome. Instead of glycerine, I have used sulphonated castor oil or Turkey red oil, although this oil is not preferred in the beverage, drug and general chemical art.

In forming the gel solution in the kettle, (2) the glycerine and glue are heated at 180° F. for one to three hours.

Where (3) the glycerine partially displaces the glycol it is added to the kettle after the glue glycol solution has been heated at 180° F. for about two hours. Thereafter the solution of the three ingredients is continued at this temperature for approximately another hour before being drawn off.

The steps previously described in the manufacture of the glue glycol latex gel cork composition are substantially followed.

The advantages and characteristics of the cork composition so produced are similar to those set forth for the glue gel latex cork composition. The product has improved flexibility and hygroscopicity and freedom from shrinkage, curling and brittleness. Again, the glycerine is a very efficient cork plasticizer and improves the life of the cork composition.

In forming a glue glycerine glycol cork composition, there is used for example, three pounds of glycol, two pounds of glycerine and one pound each of glue and latex. Six to eight pounds of glycerine are used when glycol is entirely eliminated. The same hardening agents and in similar ratio will be used for curing the glue in the same manner as above described and the resultant solution will be added to the granulated cork in the ratio above indicated.

It will be understood that bone or hide glue is illustrated as representative of the proteids above mentioned, any one of which is employed and that I produce (1) a latex proteid glycol gel, (2) a latex proteid glycerine gel, and (3) a latex proteid glycol glycerine gel. The glycerine gel is preferred for beverage purposes in view of objections heretofore ascribed to the use of glycol and sulphonated castor oil. For most other purposes, these later solvent plasticizers are satisfactory.

Latex resin

A very satisfactory cork composition comprises comminuted cork, a natural or synthetic resin and latex. In some cases I add a suitable wax.

For example, sixteen pounds of phenol to one pound formaldehyde solution (37–40%) and about two and three-quarter ounces of oxalic acid, previously dissolved in enough water to form a solution, are mixed in a suitable vessel and heated slowly, preferably by means of steam heat until reaction starts. The steam is then shut off and the mixture is allowed to react for approximately twenty minutes in the heated vessel. Thereupon, cold water is run into the reaction product to cool the same and stop the reaction. The mass is permitted to settle for about forty-five minutes to one hour, so that the resin precipitates. The water is now siphoned off and the resin is subsequently given several, i. e., about four, separate washes with water at a temperature of about 120° F. to remove the oxalic acid. In each case, the mass is permitted to settle for about twenty minutes to one-half hour and the water removed. The final product is now boiled under vacuum until the reaction product becomes clear, and substantially all remaining water is removed, and until the resin presents a viscous character having substantially the viscosity of a string. The resin is now preferably, but not necessarily, dissolved in a suitable cork plasticizer, for example, glycerine (glycol or sulphonated castor oil may be used) and is ready for admixture with the latex. The resin is in a partially cured state, and is preferably at a temperature of about 140° F. for admixture with the latex.

It is important to keep the resin solution at a temperature low enough to prevent any premature reaction or curing of the resin or any chemical effect upon the latex, such as would cause the adhesive base to deteriorate.

The resin or resin plasticizer solution having a temperature of substantially 140° F. is now mixed with the latex and, as stated, the temperature is controlled to prevent any reaction of the latex or the resin. This mixing of the resin with the latex will preferably take place just prior to the addition of a hardening agent or accelerator for the resin. In the present instance, hexamethylenetetramine is used as the hardening agent and added to the binder. The binder at a temperature or about 140–160° F. is thereupon mixed with the cork and in the manner above described. The binder coated cork is either passed to the forming instrumentality or stored at a low temperature in a chilling room, as above mentioned.

In forming the cork composition, two pounds of latex and one pound of phenolic resin are mixed as described, and to this mixture is added four ounces of the hexamethylenetetramine solution for each three pounds of binder. The binder is incorporated with the comminuted cork in the ratio of three pounds of binder to substantially twelve to thirteen pounds of comminuted cork. These proportions are purely exemplary, but are substantially followed in preparing the cork composition on a commercial scale.

As another example, a mixture of phenol formaldehyde resin and urea formaldehyde resin in a suitable plasticizer solvent, e. g., glycerine, is prepared in accordance with the applications of Andrew Weisenburg, Serial Nos. 497,615, 497,616 and 675,636; the first two are now Patent Nos. 2,121,844 and 2,094,627.

The resin or resin solution in a partially cured state and at a temperature of about 140° F. is added to the latex. It is important to keep the resin solution at temperatures low enough to prevent any premature reaction of the resin or any chemical effect upon the latex such as would cause the binder to harden or deteriorate to lose its adhesive character. Thereafter, the binder formed of the mixture of latex and synthetic resin solution is mixed with a suitable hardener or accelerator for the resin, such as hexamethylenetetramine, oxalic acid and other organic acids as described in said Weisenburg applications or sulphuric acid. Preferably, the acid hardening agents are introduced in solution in a cork plasticizer solvent such as glycerine; glycol or sulphonated castor oil may also be used.

The binder is then mixed with the cork and the cork composition is formed immediately or stored as heretofore described.

In preparing the binder, there is used, for example, two parts of the latex to one part of the resin, with a sufficient amount of oxalic acid or other hardening agent as will effect curing of the synthetic resin under a temperature of substantially 280° F. and the pressures employed in carrying out the molding or forming operation. The hardening agent in the case of oxalic and similar acids is preferably combined in equal parts with a solvent and cork plasticizer, e. g., glycerine, glycol or sulphonated castor oil and this solution is required in small percentage to harden or cure the resin. The temperatures of the oven may vary slightly and the time period also may be changed for effecting a curing of this latex resin binder, depending upon the type of resin and latex employed and the particular hardening agent. The latex resin binder will be added to the comminuted cork in the ratio of about three pounds of binder to about twelve to thirteen pounds of comminuted cork.

The latex resin cork composition products have all of the advantageous characteristics, properties and uses of the cork compositions heretofore described and are acid proof and mold proof by reason of the presence of the resin.

In referring to the Weisenburg applications, it will be understood that there is used any of the resins as well as mixtures of resins and proteins therein described. The various resins and resin mixtures set forth in the Weisenburg applications and equivalents, all of which are utilized in forming the resin latex binder of this invention have not been specifically recited in this application in order that the specification may not be unduly prolix.

In referring to the use of glycerine glycol and sulphonated castor oil as resin solvents and plasticizers, it is to be understood that for beverage purposes glycerine or equivalent non-odor and non-taste producing substances will be used.

The resins described are purely illustrative and representative of the natural and synthetic resins mentioned since any of the resins are employed as desired.

TUNG-OIL-LATEX

By tung oil latex is meant a mixture of latex and a bodied tung oil.

The tung oil is reduced to a temperature of about 180° F. for admixture with the latex. Substantially three parts latex to one part tung oil is employed.

If desired, glycerine, glycol or sulphonated castor oil or other suitable solvent plasticizer is added to the mixture. For example, a solution of the tung oil in four to eight parts glycerine is prepared by heating the two in a suitable kettle and the latex then added. The binder is mixed with the cork and the cork composition prepared as described.

This latex tung oil or latex tung oil solvent composition has all of the properties, characteristics and uses of the cork compositions heretofore described.

GELATIN-WATER-LATEX

*Gelatin water latex tung oil*

I make a very satisfactory cork composition comprising comminuted cork, gelatin dissolved in a minimum of water and latex. The gelatin is employed in about four parts to one part latex and the composition is highly satisfactory as a liner for beverage caps, as well as in the general chemical field. I may add a small amount of glycerine to this composition, if desired, it being understood that the water softens and dissolves the glue and the glycerine when used, accomplishing the same function, and also acts as a plasticizer for the cork composition. Where water is used, it is evaporated during the forming of the cork composition. If desired, the glycerine will be used entirely and water omitted. In some cases, I add about one part tung oil to either of these several mixtures since in all cases where a proteid is used, the addition of tung oil enables a greater percentage of the proteid to be used without deterioration in the presence of acids. The tung oil appears to protect the gelatin against acid reactions.

These cork compositions are particularly useful in the beverage, drug, food and chemical field and possess the advantages and characteristics of the cork compositions heretofore described.

WAX

In some cases, particularly because of its lubricating action as where the cork composition is being extruded, I add a small percentage of one of the waxes above mentioned to any one of the several binders described, before admixture with the cork. Preferably the wax is melted and added (*a*) to the gel binder or to the latex before admixture with each other, (*b*) to the latex or to the resin before admixture with each other, (*c*) to the tung oil or to the latex before admixture with each other, or (*d*) to the various binder mixtures before they are coated upon the cork particles. As stated, the wax may be added to each of the several binders and in addition to its lubricating function, it (1) renders the cork composition waterproof, resilient and flexible, as well as exerts a binding action, and (2) prevents the latex from flowing.

LATEX WAX

This cork composition comprises comminuted cork, latex, and a wax or other non-aqueous liquid such as petrolatum, pitches, fats, and resins, and the binder is prepared as described in the said patent to Weiss.

As one example, one pound of latex, and five to seven pounds wax such as paraffin are combined substantially in the manner and at the temperatures, namely above substantially 110° C., as set forth in said patent. This binder may be diluted further with latex or wax, if desired. For example, I will dilute the mixture with possibly three to six additional pounds of wax in some cases. The amounts given are exemplary and the ratio or percentage of ingredients is substantially followed in large or bulk production. The finished product can be employed in the liquid state as made, or cold molded and melted down in suitable quantities as required for use.

Three pounds of the fluid binder is mixed with about twelve to thirteen pounds of comminuted cork and the cork composition molded as desired. Preferably the binder coated cork is extruded, since I have discovered that this can be accomplished with facility due to the lubricating action of the wax and its ability to prevent the rubber from running or flowing.

Rods or sheets of the cork composition will be formed and the cork composition, as with those previously described, is used in the beverage, food, drug and chemical field and also is capable of general application.

$$\text{Latex-proteid-}\begin{cases}\text{resin}\\\text{tung oil}\end{cases}$$

I also prepare a cork composition comprising comminuted cork, latex and a proteid, with which is included a resin either natural or synthetic as above set forth. Thus substantially one to two parts phenol condensation product or mixture of phenol and urea condensation products as stated will be incorporated in the gel binder, the resin preferably being in solution in one of the solvent plasticizers as set forth.

Also, I prepare a cork composition from binder coated comminuted cork, the binder comprising latex proteid as described above, to which is added one to two parts of bodied tung oil prepared as herein above stated.

In some cases, a binder consisting of latex proteid and one to two parts each of resin and bodied tung oil is formed and this is coated on the comminuted cork which is formed into the desired cork composition.

In connection with the binders comprising latex proteid, combined with (1) a resin, (2) tung oil, and (3) both of these members, I omit in some cases the proteid. There is produced a binder comprising essentially latex tung oil and resin.

With each of the binders above mentioned is included, in some cases, a wax in the manner and for the purposes set forth.

$$\text{Latex-wax-proteid-}\begin{cases}\text{resin}\\\text{tung oil}\end{cases}$$

I have referred to a very satisfactory cork composition having a binder comprising a latex wax mixture prepared substantially in accordance with the patent to Weiss.

In some cases, I incorporate in this binder (1) a proteid, (2) a resin, and (3) tung oil. Thus I produce a cork composition comprising comminuted cork, latex wax and a proteid; latex wax and a resin or latex wax and tung oil. Again, I make a binder of (1) latex wax, proteid and resin; (2) latex wax, proteid and tung oil, (3) latex wax proteid, resin and tung oil, or (4) latex wax, resin and tung oil.

Latex-gelatin-water- $\begin{cases} resin \\ tung\ oil \end{cases}$

I have referred herein to a cork composition comprising comminuted cork and a binder comprising latex gelatin water and in which in some cases a part or all of the water is replaced with glycerine.

To this binder in like manner may be added a resin and/or tung oil.

Also, a suitable wax or latex wax is incorporated in the binder for some purposes.

I have given herein representative examples of the various cork compositions produced in accordance with this invention. It will be understood that in all cases where I have selected specific materials, that this is for purely illustrative purposes and that any one of the other materials recited or equivalents thereof will be used in similar manner.

I have referred herein to the use of a resin and I find that this material has the property of reducing mold growth and of rendering the cork composition acid resistant to a very remarkable extent.

The use of tung oil, particularly bodied tung oil, as described herein, is advantageous because it stabilizes the cork composition, preventing either expansion or contraction. Again, in the case of phenol formaldehyde and similar condensation products, the tung oil appears to react with the resin in a highly satisfactory manner to induce great tensile strength and resistance without, however, impairing the flexibility and resilience of the cork composition.

With respect to the use of a wax or a latex wax, this material will be included in any of the several binders as desired and preferably is included in all of the cork compositions where the binder coated cork particles are subjected to an extrusion operation to form either rods, sheets or other shapes.

I have referred herein to the use of natural and synthetic resins and as further exemplifying the utility of these, I make satisfactory cork compositions comprising either of a urea resin or condensation product or a "Glyptal" or alkyd resin which are quite satisfactory as cushion liners for caps in the beverage, food, drug and general chemical field. For example, I make a cork composition of comminuted cork, latex and urea or "Glyptal" resin. In some cases, the two resins are combined. In accordance with the cork composition being manufactured, I will add to the "Glyptal" latex or urea latex binder a suitable wax and/or a gel of glycerine and gelatin or glue. Where a gel is employed, I also use a suitable wax in some instances. Glycol may be substituted for glycerine, but is not generally preferred, as herein described.

I also form a cork composition of comminuted cork, latex and urea or "Glyptal" or alkyd resins and add to the same bodied tung oil as herein described. To such a cork composition may be added a wax, a gelatin or glue gel or a gel and wax as just above referred to.

I also form a cork composition comprising a urea or alkyd resin and a glue or gelatin gel, preferably employing glycerine, and to which, in some cases, will be added a wax. Moreover, another satisfactory cork composition will include as the binder a urea or alkyd resin and tung oil and, if desired, I may include a wax or a glue or gelatin gel, or both. While I prefer glycerine in cork compositions utilized in the beverage, food, drug and general chemical arts, glycol or sulphonated castor oil may be employed where odor and taste contaminations are not vital.

Throughout the specification I have indicated a preference for the use of solvents and plasticizers which will be useful in the manufacture of composition cork liners and sealing material for use in the beverage, food, drug and general chemical art. I prefer glycerine because it is free from any objectionable taste or odor imparting qualities and does not result in contaminations. On the other hand, glycol or sulphonated castor oil are useful with certain types of sealing liner material and are in general useful with all cork compositions where odor and taste contaminations and effects are not material.

In referring to a cork composition, of course, I mean the final molded extruded or otherwise formed article and in each case the comminuted cork having a standard particle size is coated with the particular binder preliminary to formation into the cork composition product.

Various modifications of the invention, as well as changes, may be resorted to, which, however, ought to be regarded as within the scope of the appended claims.

I claim:

1. A cork composition comprising cork granules, rubber, bodied tung oil, a protein adhesive, and a resin in amount to constitute a binder, and a plasticizer, said cork predominating by volume.

2. A cork composition comprising cork granules, rubber, bodied tung oil, and a resin in amount to constitute a binder, and a plasticizer, said cork predominating by volume.

3. A cork composition comprising cork granules, rubber, bodied tung oil, and a protein adhesive in amount to constitute a binder, and a plasticizer, said cork predominating by volume.

CHARLES E. McMANUS.